Patented Jan. 23, 1940

2,188,273

UNITED STATES PATENT OFFICE 2,188,273

POLYMERIZATION OF DRYING OILS

Hein Israel Waterman, Delft, and Cornelus Van Vlodrop, Rotterdam, Netherlands, assignors to Imperial Chemical Industries Limited, a corporation of Great Britain No Drawing. Application July 12, 1937, Serial No. 153,294. In Great Britain July 22, 1936

5 Claims. (Cl. 260—407)

This invention relates to the polymerization of drying oils; and it comprises a method of polymerizing drying oils wherein the oil is heated to a polymerizing temperature in the presence of sulfur dioxide under conditions producing a maximum liquid-gas contact between the oil and sulfur dioxide, the treatment being continued for such time as to produce substantial polymerization of the oil; all as more fully hereinafter set forth and as claimed.

In British Patent No. 343,099 there is described a process for the manufacture of thermoplastic vulcanisable products from unsaturated fatty oils which comprises polymerizing the fatty oils by heating in the presence of a non-oxidising gas and thereafter thickening the polymerized oil by dissolving therein, with heating, a salt of a higher fatty acid. Amongst suitable non-oxidising gases are mentioned sulphuretted hydrogen, sulphur dioxide, nitrogen, hydrogen and carbon dioxide. In one example of the process described in the said patent a slow stream of sulphur dioxide is passed for 5 hours through linseed oil at 290–300° C. the pressure in the apparatus being maintained at about 5 mm. of mercury.

The present invention has as an object to provide a method of polymerizing drying oils which will be much faster in operation than previously known methods. A further object is to provide an improved method of polymerizing drying oils. A still further object is to provide a method whereby lighter coloured polymerized drying oils can be obtained. Further objects will appear hereinafter.

The invention is applicable in general to all polymerizable triglyceride oils having drying properties, such as linseed oil, soya bean oil, sardine oil, etc.

These objects are accomplished by the following invention. We have now found that among the gases abovementioned sulphur dioxide is unique, in that under suitable reaction conditions it effects a remarkable acceleration of the polymerization. Our experiments show that under the conditions described in British Patent No. 343,099 there is little or no difference in the results obtained with the various gases mentioned. When, however, the process is so modified as to ensure intimate contact between the gas and the oil, the unique properties of sulphur dioxide are realised.

In order to secure intimate contact we employ one or more of the following methods:

(1) Increasing the normally low solubility (at the reaction temperatures employed) of $SO_2$ in linseed and other drying oils, as by the use of superatmospheric partial pressure of $SO_2$ above the oil;

(2) Passage of a rapid stream of $SO_2$ through the oil, advantageously through some form of dispersing nozzle or equivalent device, thus dispersing the gas and distributing it uniformly throughout the oil in the form of small bubbles;

(3) Vigorous agitation or stirring of the oil, with the same effect as method (2).

(4) Exposure of a large surface of the oil to the gas, e. g. by spraying the oil into a chamber containing the gas, or by heating relatively thin layers of the oil in contact with the gas.

We prefer to employ dry $SO_2$ in the present invention, as in the presence of water there is a tendency for the product (i. e. the bodied drying oil) to be discoloured. Further, when polymerization has been effected to the desired extent, it is advisable to remove the $SO_2$ from the product as completely as possible because in the absence of such removal, the product may, after a period of time, deteriorate. If, however, the $SO_2$ is substantially completely removed, there appears to be no deterioration of the product. Said removal of $SO_2$ can conveniently be effected by displacement with an inert gas such as nitrogen or $CO_2$, which is advantageously blown through the oil while still hot, or by degassing the hot oil in vacuo.

In general, the temperature at which the process is carried out should not exceed 300° C. as above this temperature the oil tends to decompose and the products are liable to be of bad colour and high acid value.

The following examples illustrate but do not limit the invention.

Example 1

Alkali-refined linseed oil was heated at 295–300° C., being stirred by means of a stirrer at 170 R. P. M., for an hour, during which time sulphur dioxide was passed through the oil. In a series of tests with different rates of supply of sulphur dioxide, the product showed the following relative viscosities at 20° C.

| Rate of $SO_2$ in ccs. per min. | Relative viscosity |
|---|---|
| 15 | 10.0 |
| 35 | 52.4 |
| 55 | 77.9 |
| 75 | 81.4 |
| 118 | 86.4 |

Under the same conditions a current of nitrogen at 118 ccs. per min. gave a product having viscosity 1.3 after 1 hour and only 9.6 after 3 hours.

Example 2

This example shows the catalytic effect of $SO_2$ as compared with other gases, at the same rate of flow of gas, temperature and stirring-rate.

300 ccs. of linseed oil were heated for 1 hour at 290–295° C. and gas was supplied at a rate of 55 ccs. per min. The following results were obtained:

| Gas used | Stirring rate R. P. M. | Relative viscosity of product (poises at 20° C.) |
|---|---|---|
| Nitrogen | 3600 | 1.15 |
| $H_2S$ | 3600 | 1.8 |
| $SO_2$ | 3600 | 42.0 |

In order to obtain an oil of viscosity about 40 poises at the same temperature a heating time of about 7 hours is necessary in the absence of $SO_2$.

Example 3

This example shows the advantage of increasing the rate of stirring (hence the efficiency of dispersion of the gas throughout the oil), other conditions being the same.

300 ccs. of linseed oil were heated for 1 hours at 290–295° C. and $SO_2$ gas was supplied at a rate of 55 ccs. per minute. With a stirring rate of 3600 R. P. M., the viscosity of the product was 42 poises, whereas with a stirring rate of 88 R. P. M. the viscosity of the product was 21 poises.

Example 4

A vessel one-fourth filled with linseed oil and three-quarters filled with $SO_2$ gas at atmospheric pressure and room temperature is closed and heated to about 300° C. After a heating time of 1 hour, the resulting product has a viscosity of 11 poises. By further increasing the pressure of $SO_2$ above the oil in the closed vessel, thus increasing the quantity of $SO_2$ in solution, the rate of polymerization is further increased.

A similar run employing nitrogen instead of $SO_2$ results in a product having a viscosity of only 0.6 poise.

Example 5

A sample of soya bean oil is heated to 293–295° C., $SO_2$ being passed through it at a rate of 55 ccs. per minute and the oil being stirred at 3600 R. P. M. At the end of 1 hour the product has a viscosity of 3.1 poises (at 20° C.).

A comparative run with nitrogen in place of $SO_2$ gave a product with a viscosity of 0.65.

Example 6

Under the same conditions as in Example 5, a Japanese sardine oil gave a product having a viscosity of 17.9 poises. The product from a similar experiment using nitrogen instead of $SO_2$ had a viscosity of 6.75.

The principal advantage obtained by this invention is that, at a given temperature, a high-grade stand oil can be produced in a fraction of the time (e. g. one-seventh) required in the ordinary bodying processes, the acceleration of the polymerization not being gained at the expense of the yield or quality of the product. Further, starting with raw (unrefined) linseed oil or other drying oils, the products are comparatively light-coloured.

As many apparently widely different embodiments of this invention may be made without departing from the spirit and scope thereof, it is to be understood that we do not limit ourselves to the specific embodiments thereof, except as defined in the appended claims.

We claim:

1. In the manufacture of bodied oils by heating drying fatty oils at a pressure not less than atmospheric pressure to polymerizing temperatures in the presence of $SO_2$, the improvement which comprises passing a current of $SO_2$ gas into and through the hot oil at a rapid controlled rate and simultaneously vigorously agitating the mixture to ensure uniformly intimate contact between the $SO_2$ and all the oil, thus accelerating the polymerization of the oil, the pressures, agitation and rate of gas flow being correlated to produce a maximum liquid-gas contact between the oil and sulfur dioxide during said heating, the amount of sulfur dioxide maintained in contact with the oil being sufficient to substantially accelerate the polymerization.

2. The process of claim 1, wherein the polymerized drying oil so obtained is subsequently treated to remove residual $SO_2$ dissolved therein.

3. The process of claim 1, wherein the heating is effected under superatmospheric pressure.

4. The process of claim 1, wherein said heating is to a temperature between 290 and 300° C.

5. In a process for the production of polymerized drying oils by heating an oil having drying properties in the presence of sulfur dioxide under conditions producing intimate admixture and contact between the oil and sulfur dioxide, the improvement which comprises increasing the solubility of $SO^2$ in the oil by the use of superatmospheric partial pressure of $SO_2$ above the oil, the treatment being at such temperature and continued for such time as to produce substantial polymerization of the oil.

HEIN ISRAEL WATERMAN.
CORNELUS VAN VLODROP.